United States Patent [19]

Legerius et al.

[11] 4,172,962
[45] Oct. 30, 1979

[54] TERMINAL BOX INTENDED TO BE USED IN COMBINATION WITH A SOCKET OUTLET OR THE LIKE

[75] Inventors: Bengt E. Legerius; Stig-Arne Löfving, both of Nyköping, Sweden

[73] Assignee: Telefonaktiebolaget L M Ericsson, Stockholm, Sweden

[21] Appl. No.: 825,181

[22] Filed: Aug. 17, 1977

[30] Foreign Application Priority Data

Sep. 8, 1976 [SE] Sweden .............................. 7609937

[51] Int. Cl.² ............................................. H02G 3/10
[52] U.S. Cl. ........................................ 174/53; 174/48
[58] Field of Search ............................. 174/48, 49, 53

[56] References Cited

U.S. PATENT DOCUMENTS 965,187  7/1910  Hopkins ........................... 174/53 X

FOREIGN PATENT DOCUMENTS 1175121  12/1969  United Kingdom ..................... 174/48

OTHER PUBLICATIONS

German Auslegeschrift 1,127,430, Apr. 1962.

*Primary Examiner*—Thomas J. Kozma
*Assistant Examiner*—D. A. Tone
*Attorney, Agent, or Firm*—Hane, Roberts, Spiecens & Cohen

[57] ABSTRACT

A terminal box intended to be used in combination with a socket outlet or the like of outside the wall type in such a way that the terminal box is arranged between the socket outlet and the wall supports the socket outlet.

7 Claims, 6 Drawing Figures

TERMINAL BOX INTENDED TO BE USED IN COMBINATION WITH A SOCKET OUTLET OR THE LIKE

FIELD OF THE INVENTION

The present invention relates to electrical terminal boxes and is preferably intended to be used in combination with socket outlets or similar devices of outside the wall type. Such outside the wall type devices are mainly used when completing or modernizing already existing electrical installations and in so called electric channel systems either for directly mounting in the electric channels or for mounting in so called socket boxes.

PRIOR ART

When completing and modernizing already existing electrical installations it is often common to work with visible wires and devices and terminal boxes of the outside the wall type. Such wires are seldom esthetically attractive but are nevertheless used with regard to the great interferences in the buildings and the high costs which hidden running of wires brings about. In electric channel systems which, for example, are used in industrial buildings and offices power wires as well as telephone wires and signal wires of different kinds are run to the different working places in channels which usually are mounted at table height alongside the walls. At each working place a socket box is arranged containing a suitable number of socket outlets for electrical power as well as outlets for telephone wires and signal wires. The mounting in the socket boxes is made on the rear side of the box and the wall outlets are "built forward" by using special distance parts so that they will be placed in alignment with the front part of the socket box. The coupling of the electrical wires is made in a separate terminal box which is placed beside the outlets which implies that the sideways extension of the socket boxes becomes unnecessary large.

SUMMARY OF THE INVENTION

The present invention seeks to reduce the need for separately placed terminal boxes, which besides giving economic advantages also results in a more attractive appearance of the installation, which is of special importance when the running of wires is visible. Furthermore, it results in a less space demanding installation, which, in case of electric channel systems, renders it possible to better use the space in the respective socket boxes which permits a reduction of the dimensions of the socket boxes.

This is achieved by giving the terminal box the characteristics of the following claims.

BRIEF DESCRIPTION OF THE DRAWINGS

An embodiment of the terminal box will be described in connection to the appended drawing, in which.

DETAILED DESCRIPTION

Figure 1:
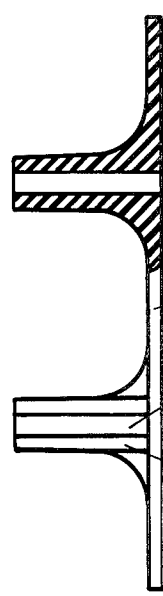
FIG. 1 shows the bottom plate of the terminal box in side view partially in section.
Figure 2:
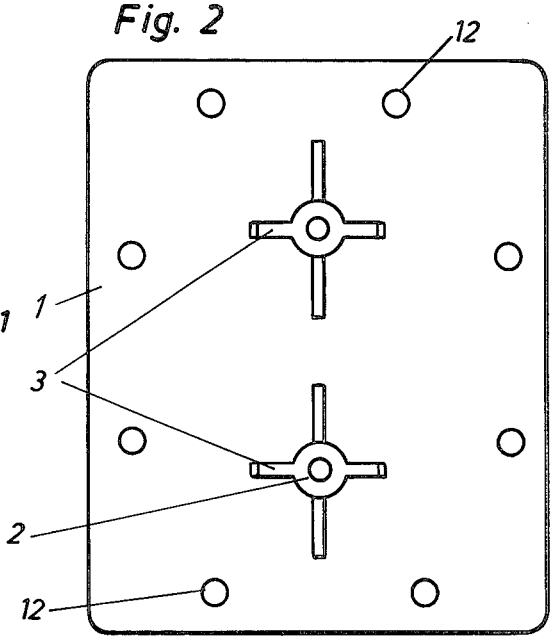
FIG. 2 shows the same bottom plate in plan view.

In FIGS. 1 and 2, show the bottom plate of the terminal box which is made of plastic. Numeral 1 designates the plate itself which is provided with devices 2 for carrying a socket outlet or a similar apparatus. In the illustrated embodiment, the devices consist of two tubes internally formed with the bottom of the box and said tubes are provided with external longitudinal stiffenings 3 which extent crosswise with respect to the longitudinal direction of the box and run the entire length of the tube and constitute together with the end surface of the tube, a surface on which the socket outlet is intended to be mounted.

Figure 3:
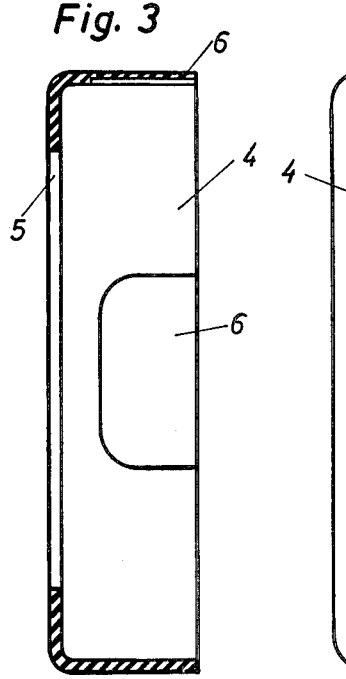
FIG. 3 shows the casing of the terminal box in section and seen from the side.
Figure 4:
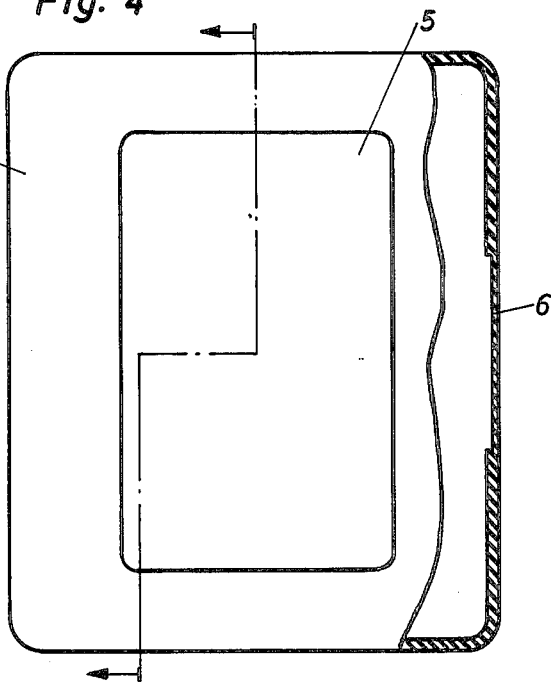
FIG. 4 shows the same casing partly in section in plan view.

The casing 4 of the terminal box which is shown in FIGS. 3 and 4 has an opening 5 which is large enough to allow the casing to be brought in place after an insert of a socket outlet or other apparatus is mounted on the bottom plate. The sides of the casing are provided in known manner, with thinner parts 6 which are easy to cut away in order to make it possible to pull the wires into the box.

Figure 5:
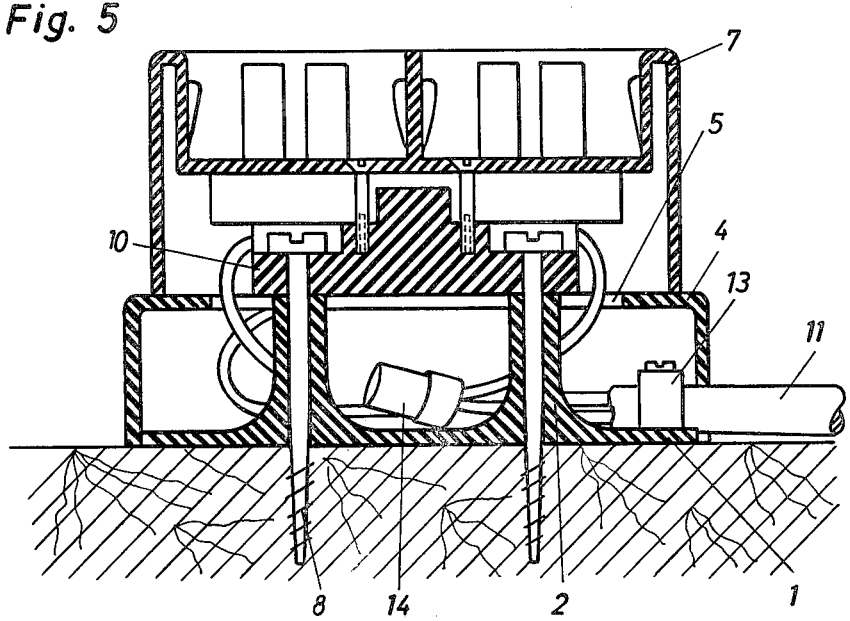
FIG. 5 shows in section the terminal box together with a socket outlet mounted on the box.

In FIG. 5 a terminal box is shown which is fastened on a frame and on which a socket outlet is mounted comprising cover 7 and insert 10. The bottom plate 1 of the box is fastened to the frame by screws 8 which also serve as binding screws for the insert 10 of the socket outlet. After the bottom of the box and the insert have been mounted incoming and outgoing wires 11 are run to and into the box where they are held by means of a clamp 13 which is fastened by utilizing a pair of the eight holes 12 in the bottom plate, which holes are shown in FIG. 2. The conductors which are actually used for the connection in the socket outlet are connected to the insert while the other conductors are connected together by means of a wire connector of a conventional type. When the connections are finished the casing 4 of the box is mounted in place to surround the bottom plate 1 and the side wall is cut at 6 for the wires 11. The end surfaces of the tubes 2 and the upper side of the casing of the box are situated in the same plane which implies that when the cover 7 of the socket outlet is mounted, this fixes the casing of the box to the frame as well as closes the opening 5 of the casing of the box.

Figure 6:
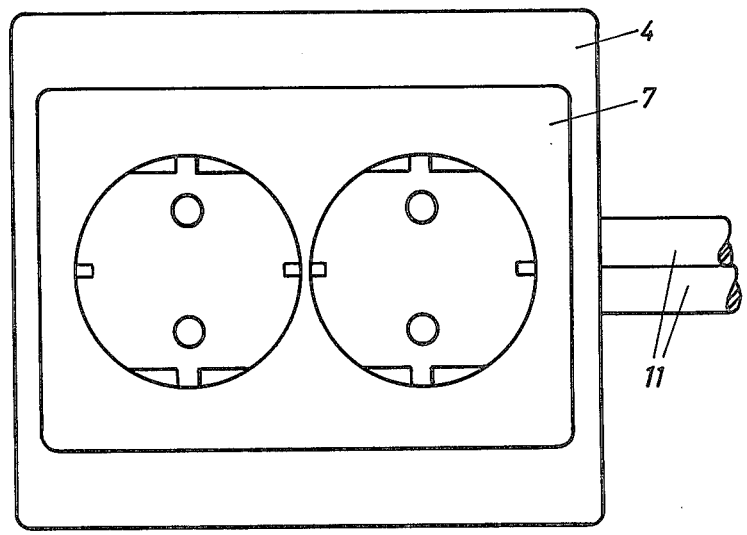
FIG. 6 shows the same combination in plan view.

FIG. 6 shows in plan view of a terminal box with a mounted socket outlet and incoming as well as outgoing wires. Naturally, the incoming and outgoing wires can be placed one each side of the terminal box and in those cases when 3-phase feeding of the electrical power is used, the connection of the unused phase conductor is effectuated inside the box.

We claim:

1. An electrical terminal box in combination with a socket outlet of outside the wall type, said terminal box comprising a bottom plate including two upstanding tubular members, said socket outlet including an insert engaged on said tubular members, means engageable with said insert and said tubular members for securing the same together as an assembly and for mounting the assembly on a wall, a casing mounted on said assembly to surround said bottom plate, said casing having an upper wall with an opening of sufficient size to receive said tubular members and said insert said tubular member projecting through said opening and said insert being disposed above said upper wall, said casing having removable means for forming an aperture for passage therethrough of electrical conductors extending to said insert, and a cover detachably secured with said insert and engaging said casing to hold the same in place.

2. The combination as claimed in claim 1 wherein said cover has a lower edge which engages said upper wall of the casing when the cover is secured to said insert.

3. The combination as defined in claim 1 wherein said casing defines a cavity below said upper wall in which connections for said conductors can be made and subsequently enclosed by said cover.

4. The combination as defined in claim 1 wherein said casing has side walls extending downwardly from said upper wall, said removable means being in one of said side walls.

5. The combination as defined in claim 4 wherein said removable means comprises a thinner removable portion in said one of said side walls.

6. The combination as defined in claim 1 wherein said bottom plate is provided with a plurality of pairs of holes for respectively receiving a clip for said electrical conductors.

7. The combination as defined in claim 1 wherein said tubular members have bores extending completely therethrough, said means for securing the insert and tubular member together comprising fastener means penetratable through said bores for attachment to the wall on which said assembly is to be mounted.

* * * * *